United States Patent
Hefetz et al.

(10) Patent No.: US 9,811,919 B2
(45) Date of Patent: Nov. 7, 2017

(54) PHOTO TAGGING SYSTEM AND METHOD

(71) Applicant: PIC2GO LTD, Petah Tikva (IL)

(72) Inventors: Eitan Hefetz, Petah Tikva (IL); Eran Schaffer, Hod Hasharon (IL)

(73) Assignee: PIC2GO LTD, Petah Tikva (IL)

( * ) Notice: Subject to any disclaimer, the term of this patent is extended or adjusted under 35 U.S.C. 154(b) by 0 days.

(21) Appl. No.: 14/943,046

(22) Filed: Nov. 17, 2015

(65) Prior Publication Data

US 2016/0232685 A1    Aug. 11, 2016

Related U.S. Application Data

(63) Continuation of application No. PCT/IL2015/050649, filed on Jun. 24, 2015.
(Continued)

(51) Int. Cl.
*G06K 9/00* (2006.01)
*G06T 7/40* (2017.01)
(Continued)

(52) U.S. Cl.
CPC .......... *G06T 7/408* (2013.01); *G06K 7/10722* (2013.01); *G06K 7/1417* (2013.01); *G06K 9/00724* (2013.01); *G06K 9/4609* (2013.01); *G06K 9/4638* (2013.01); *G06K 9/6201* (2013.01); *G06T 7/90* (2017.01); *H04L 51/10* (2013.01); *H04L 51/32* (2013.01); *G06K 2209/27* (2013.01);
(Continued)

(58) Field of Classification Search
CPC .......... G06T 7/408; G06T 2207/10024; G06T 2207/30196; G06K 7/10722; G06K 7/1417; G06K 9/6201; G06K 9/00496; G06K 9/4609; G06K 9/4638; H04L 51/10; H04L 51/32; H04L 43/04; G09B 19/0038
USPC .......................................... 382/115, 162, 165
See application file for complete search history.

(56) References Cited

U.S. PATENT DOCUMENTS 5,233,172 A †   8/1993   Chadima
5,436,611 A *   7/1995   Arlinghaus, Jr. .. A63B 71/0605
                                                          340/323 R
(Continued)

FOREIGN PATENT DOCUMENTS

CN   2011136313      †  6/2011
WO   2005076211 A1   †  8/2005
WO   2013112851 A1   †  8/2013

OTHER PUBLICATIONS

PCTIL2015050649-tpcd-000053-en-20160913.
(Continued)

*Primary Examiner* — Kanjibhai Patel
(74) *Attorney, Agent, or Firm* — Novick, Kim & Lee, PLLC; Jae Youn Kim

(57) ABSTRACT

A system for matching one or more participants of an event to a digital photograph they appear in. An image processing module analyzes a digital photograph of the event where one more participants appear and identifies one or more barcodes worn by the participants. Each barcode comprises a matrix with a unique value associated with a participant ID. A matrix analysis module reads the identified matrix, calculates its value and matches the participant with said digital photograph the participant appears in.

35 Claims, 11 Drawing Sheets

Related U.S. Application Data

(60) Provisional application No. 62/016,106, filed on Jun. 24, 2014.

(51) Int. Cl.
*G06K 9/46* (2006.01)
*G06K 7/10* (2006.01)
*G06K 7/14* (2006.01)
*G06K 9/62* (2006.01)
*H04L 12/58* (2006.01)
*G06T 7/90* (2017.01)

(52) U.S. Cl.
CPC ............ *G06T 2207/10024* (2013.01); *G06T 2207/20132* (2013.01); *G06T 2207/30196* (2013.01)

(56) References Cited

U.S. PATENT DOCUMENTS

| | | | |
|---|---|---|---|
| 6,873,731 B2 † | 3/2005 | Takakura | |
| 7,702,162 B2 * | 4/2010 | Cheong | G06K 19/06037 235/494 |
| 7,920,158 B1 * | 4/2011 | Beck | H04N 5/23219 348/14.08 |
| 8,355,571 B2 † | 1/2013 | Oh | |
| 9,283,472 B2 * | 3/2016 | Platzer | |
| 9,352,225 B2 * | 5/2016 | Ruke | A63G 31/00 |
| 2005/0207641 A1 † | 9/2005 | Bala | |
| 2009/0169062 A1 * | 7/2009 | Cheung | G06Q 30/02 382/115 |
| 2014/0036103 A1 † | 2/2014 | Bae | |
| 2014/0210734 A1 * | 7/2014 | Windbrake | H04L 65/403 345/173 |

OTHER PUBLICATIONS

PCTIL2015050649-tpcd-000054-en-20160913.
PCTIL2015050649-tpcd-000055-en-20160913.
PCTIL2015050649-tpcd-000056-en-20160913 (translation attached).
PCTIL2015050649-tpcd-000057-en-20160913 (translation attached).
PCTIL2015050649-tpcd-000058-en-20160913.
PCTIL2015050649-tpcd-000059-en-20160913 (translation attached).
PCTIL2015050649-tpcd-000060-en-20160913.
PCTIL2015050649-tpcd-000061-en-20160913.
PCTIL2015050649-tpcd-000062-en-20160913.
Andrew Kirillov, "Glyphs' Recognition", 17 Pages, Nov. 5, 2010, AForge.net.†
Shane Thomas, Written Opinion of the ISA, 8 pages, dated Jul. 1, 2016, USPTO, Alexandria, Virginia USA.†

\* cited by examiner
† cited by third party

PHOTO TAGGING SYSTEM AND METHOD

TECHNICAL FIELD

The present invention relates to photo tagging in general, and in particular to a system and method to speed-up photo tagging at mass participation events.

BACKGROUND ART

Photo-tagging (also known as photo-classification or photo-indexing) is a process of matching photographs to the photographed people in them. This process frequently takes place in mass participation events such as competitions (running, cycling, triathlons etc.), branded events (such as experiential marketing activations, concerts, corporate events, trade shows etc.) and visitors attractions (as amusements parks, museums etc.).

The event organizers arrange to take photographs of the event participants and then offer participants access to the photos they appear in. The event photos can be offered to participants either for free or for a fee.

At present, at many mass-participation events, photo-tagging is performed manually. That is, a person goes over each photo and identifies the participants in the photo via their participant identification, for example, a number on a participant bib-number (chest-number) or plates with unique participant numbers. The manual process, performed by humans, can be slow and error-prone.

In certain sporting events such as road bicycle tournaments, there is little room to place a participant identification number in a visible position. This limits the option of human based photo-tagging in such events.

Another alternative used today is to tag a photo with a timestamp of the event. For example, in a race, the timestamp since the race launch. This method is limited to racing-type events and is error-prone due to gaps between the timing of the cameras and the official timing of the race. Also, in large races, people are launched at different times (first the professionals/fastest runners etc.) thus there is no unique timestamp from a launch. This method is also limited to taking pictures at certain locations of the race, best of them is typically the finishing line, where every participant remembers the time he made. This method does not lead itself for automatic participant recognition, but rather for people manually looking for their own picture. For example, if you know you finished the race in 55:10 minutes, you can look for pictures showing the end line with the time close to the time you made.

Another alternative for the timestamp matching described above is to match the photograph shooting time with timing system records, typically based on Radio Frequency Identification (RFID) chips carried by participants and read by RFID-mats that read the RFID chip when a participant steps over the RFID-mat. This method can be automated by sending a photograph taken at time X to the participant who's RFID timing was recorded at X. However, this method is error prone because of gaps between the RFID timing and camera timing. Even a gap of 1-2 seconds in a race, can lead to a picture showing another participant. Automatically posting photographs, for example on a social network, showing the wrong participants is something to be avoided.

In non-sporting events (such as festivals) the options for photo-tagging are very limited at present. A common practice is to collect personal contact information (e.g.—email) of the photographed people just after taking their photos. This process slows down the event photography operation. Another common practice is to place all the event photographs together, and let each participant browse through all the photographs and identify himself photographs he appears on. This is obviously a cumbersome and error-prone process.

SUMMARY OF INVENTION

It is an object of the present invention to provide a system for automatically identifying participants of an event in digital photographs of the event.

It is another object of the present invention to provide a system for automatically identifying participants of an event in digital photographs of the event by using individual machine-readable tags worn by the participants.

It is a further object of the present invention to provide a system for automatically identifying participants of an event in digital photographs of the event by using individual barcodes of 5×5 or 6×6 cells.

It is another object of the present invention to provide a system for automatically identifying participants of an event in digital photographs of the event in a fast and accurate manner.

The present invention relates to a computerized system comprising a processor and memory for matching one or more participants of an event to a digital photograph they appear in, the system comprising:

(i) an image processing module adapted for analyzing a digital photograph of one or more participants of said event taken from a distance of 1 to 25 meters and captured in angle of up to 60 degrees and identifying one or more barcodes, each barcode comprising a square-shaped matrix made of up to 8×8 cells each matrix having a unique value, said unique value being associated with a participant identification (ID); and (ii) a matrix analysis module adapted for reading a matrix identified by the image processing module, calculating its value and determining the participant identification ID associated with said value thus matching the participant with said digital photograph the participant appears in.

In some embodiments, the digital photograph is a color digital photograph.

In some embodiments, an image binarization module transforms each pixel of said color digital photograph to either a black or a white pixel according to a predetermined threshold, thus producing a black and white digital photograph.

In some embodiments, the image binarization module averages the Green, Red, Blue (RGB) values of each pixel and then applies a predetermined threshold value above which the value of the pixel is transformed to black and below or equal to the value of the threshold the value of the pixel is transformed to white.

In some embodiments, the value of the threshold is calculated in consideration with geographic and climatic conditions of the event.

In some embodiments, averaging the RGB values of each pixel is achieved by assigning a different weight to each RGB value.

In some embodiments, the decision whether to transform a pixel to black or white also considers the values of neighboring pixels.

In some embodiments, the term black refers to any dark color and the term white refers to any light color.

In some embodiments, an image grayscaling module transforms said color digital photograph to a grayscale digital photograph.

In some embodiments, the image processing module identifies a matrix by reducing the size of the digital photograph and searching for a black frame surrounding the matrix, and a white frame surrounding said black frame.

In some embodiments, the image processing module takes into consideration race specific parameters and interference with other objects.

In some embodiments, the image processing module is further adapted to analyze the photograph area inside the identified black frame by performing a 3-dimensional to 2-dimensional transformation analysis.

In some embodiments, the matrix is a 5×5 cells matrix or a 6×6 cells matrix.

In some embodiments, the 5×5 pixels matrix and 6×6 pixels matrix are surrounded by a black frame.

In some embodiments, the black frame is surrounded by a white frame.

In some embodiments, the matrix is a rectangle with whose width is between 2 and 6 centimeters (cm) and whose height is between 2 and 6 cm.

In some embodiments, the matrix value is the participant identification.

In some embodiments, the matrix value is the participant ID; a function is applied to transform the matrix value to the participant identification by computation or translation; or matrix values and associated participant tags ID's are stored in a database.

In some embodiments, the matrix is placed on a participant tag.

In some embodiments, the participant tag is a race bib, bicycle plate, helmet sticker, name tag, branded cards or branded stickers.

In some embodiments, the system further comprises an image resizing module adapted to resizing an original photograph to a lower resolution photograph, so that the resized photograph is processed faster by the image processing module, said lower resolution being any value between 2,000 pixels and 3,000 pixels.

In some embodiments, the digital photograph is sent to the participant via electronic mail and/or loaded to a social network account associated with the participant.

In some embodiments, the digital photograph is resized to a lower pixel value before being sent to the user via electronic mail and/or before uploaded to a social network.

In some embodiments, the digital photograph is loaded to the participant's Facebook™ account, and the digital photograph is resized to the Facebook™ image publishing size.

In some embodiments, the system further comprises an image overlay module adapted for overlaying on the digital photographs data elements associated with the participant.

In some embodiments, the data elements relate to race information comprising average participant speed, distance covered by the participant, position of the participant on a map, location of the participant or any combination thereof.

In some embodiments, the position of one or more data elements is based on the position of a barcode in the digital photograph.

In some embodiments, the digital photograph is retouched with one or more special effects based on the matrix position in the photo.

In some embodiments, the special effects comprise: changing the colors to black and white around the participant in order to highlight the participant in the digital photograph; changing the focus around the participant in order to highlight the participant in the digital photograph; changing the contrast around the participant in order to highlight the participant in the digital photograph; and generating a photo-collage by cropping specific areas in several digital photographs of the participant and combining them to one collage photograph.

In another aspect, the present invention relates to a computerized method comprising a processor and memory for matching one or more participants of an event to a digital photograph they appear in, the method comprising the steps of:

(i) analyzing a digital photograph of one or more participants of said event taken from a distance of 1 to 25 meters and captured in angle of up to 60 degrees and identifying one or more barcodes, each barcode comprising a square-shaped matrix made of up to 8×8 cells each matrix having a unique value, said unique value being associated with a participant identification (ID); and (ii) reading a matrix identified in step (i), calculating its value and determining the participant ID associated with said value thus matching the participant with said digital photograph the participant appears in.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to a computerized system and method for matching one or more participants of an event to a digital photograph they appear in. The event can be a sports event such as a race, triathlon, bicycle race etc. or a social event such as a festival, parade, march, wedding etc. The organizers of such events typically have many photographs taken of the event, and wish to make the photographs available in a timely manner either for free as part of the event services or for a fee.

The way to recognize participants in a digital photo is by assigning each participant a unique event identification (ID) and having the participant wear or have in his proximity a machine readable tag that is associated with the participant ID. For example, in many races, each runner (participant) is assigned a unique chest number. A machine readable tag, such as a barcode, is printed on a bib provided by the race organizers and which the runner attaches to his shirt. The machine readable tag can appear on a bib, sticker, bicycle plate, helmet sticker, name tag, branded cards or branded stickers. The machine readable tag can even be printed on a shirt or other wearable products.

In some embodiments, the machine readable tag is a 2-dimensional (2D) barcode, with a maximum size of 8×8 cells.

In some embodiments, the machine readable tag is a 2-dimensional (2D) barcode, with a size of 5×5 or 6×6 cells.

Figure 1A:
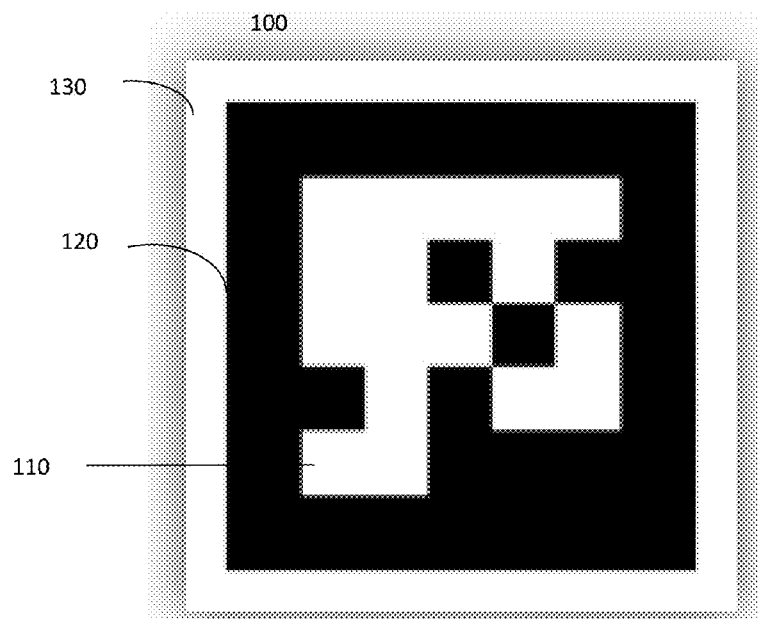
FIGS. 1A and 1B are embodiments of 5×5 and 6×6 2D barcodes.
Figure 1B:
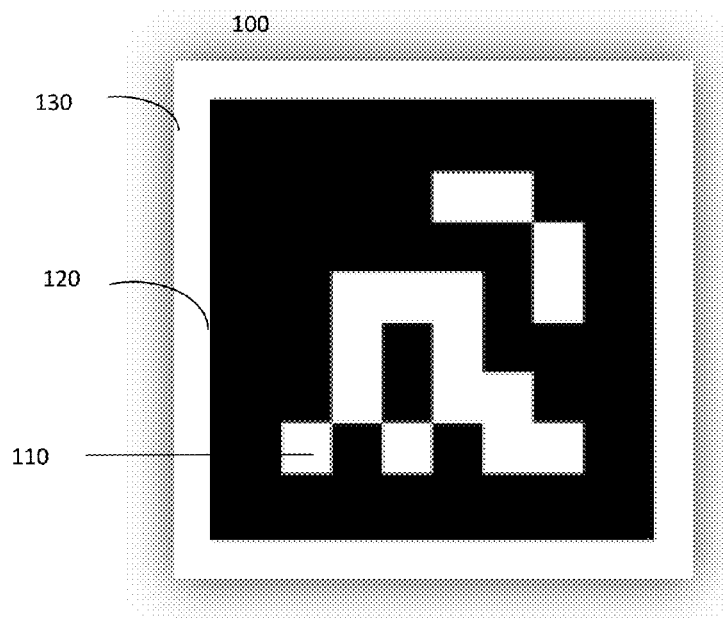

FIG. 1A is an example of a 2D barcode 100 comprising a matrix 110 of 5×5 cells, and FIG. 1B is an example of a 2D barcode 100 comprising a matrix 110 of 6×6 cells.

In some embodiments, the cells (matrix 110) are surrounded by a black frame 120, and the black frame 120 is further surrounded by a white frame 130, as is shown in FIGS. 1A-1B.

The physical size of the barcodes 100 (when printed on bibs, cards etc.) can typically be 3.5 centimeters (cm) by 3.5 cm for the black square 120, and 4.1 cm by 4.1 cm including the white frame 130. This size however could be smaller or larger by 50% or even more.

The system of the invention comprises an image processing module adapted for analyzing a digital photograph of the event and identifying one or more square-shaped matrixes 110. The photographs can be taken from a distance of 1 to 25 meters and captured in angle of up to 60 degrees to the matrixes 110 to be identified.

The invention typically uses barcodes 100 with a matrix 110 including relatively small number of cells, up to 8×8 cells and in many occasions 5×5 or 6×6 cells. The relatively small number of cells makes the cell size much larger than the cell of a regular QR (Quick Response) codes which may have from 20×20 cells to 50×50 cells and even more (assuming that both barcodes, of the invention and regular, are of relatively similar size). The 2D barcodes of the invention 100 are thus optimized to be identified in photographs taken from a distance ranging from 1 to 25 meters. This is in order to support real-life events scenarios, where photographs are taken by event photographers (or automated cameras) shooting event participants from various distances.

The barcodes of the invention 100 are also optimized to be accurately identified even if not mostly facing the camera. The barcodes 100 can identified even if the photograph was taken from an angel up to 60 degrees. In a mass participation event, the photographer has no control where each participant is positioned and many photographs can be taken from an angle, thus it's important to be able to recognize the machine readable tag (barcode 100, matrix 110) on the photograph even when the photograph was taken from an angle.

This is a most important characteristic—especially for endurance events photography where photographers might need to stand to the side of the route, or when barcodes 100 are position on side plates (or side helmet stickers).

Figure 2:
FIG. 2 shows an example of a photograph from a race showing multiple participants.

The image processing module can identify multiple barcodes 100 in the same digital photograph—as an event photograph can include multiple participants (each will have a unique barcode 100) as can be seen in FIG. 2 showing a photograph from a race with multiple participants in it.

Furthermore—each participant can have more than one instance of his/her unique barcode 100 (e.g.—on helmet sticker and bike plate).

The system can identify any number of barcodes 100 in one photograph in less than 1 second in a typical computing configuration such as a laptop with 2 GB memory, a single core processor running Windows XP™.

The image processing module can identify barcodes 100 even in sub-optimal light conditions. This is essential for identification in outdoor events as well as indoor events, in different weather conditions or for night-time events (using supporting light such as flashes).

The value of each matrix 110 is associated with a participant ID. In many cases, the matrix 110 value is the participant ID, for example, matrix 110 value 55 is associated with participant ID 55.

Alternatively, a function can be used based on the matrix 110 value to calculate the participant ID by computation or transformation. For example, the participant ID can be the matrix 110 value plus another value or multiplied by another value. For example, the participant ID can be the matrix 110 value+1,000 (matrix ID 503 is associated with participant ID 1,503) or the participant ID can be the matrix 110 value multiplied by 10 (matrix 110 ID 503 is associated with participant ID 5,030).

Alternatively, the system can comprises a database for storing values for each matrix 110 and a participant identification (ID) associated with each value. For example, matrix 110 (barcode 100) value 153 can be associated with (linked to) participant ID 2,518.

The participant ID itself can point out to further participant details such as name, telephone, email address, social network accounts etc.

The system also comprises a matrix analysis module adapted for reading a matrix 110 and calculating its value. Each matrix 110 value is associated with a participant identification thus matching the participant with the digital photograph he appears in. In some events, it may happen that a team will have one participant ID for all members, thus all team members will wear the same barcode 100, and in this case the barcode 100 will identify the team and not individual participants.

In some embodiments, the first step is an image binarization in order to transform a color digital photograph to a black and white digital photograph. The binarization can also be to a dark color (not always black) and a light color (not always white), but for clarity reasons, the specification will refer to black and white photographs that can also be a dark color and/or light color.

Color digital photographs are made of pixels, and pixels are made of combinations of primary colors. A channel in this context is the grayscale image of the same size as a color image, made of just one of these primary colors. For instance, an image from a standard digital camera will have a red, green and blue (RGB) channel. A grayscale image has just one channel.

The image binarization module of the invention converts an RGB color photograph to a black and white photograph. Each pixel of an RGB color photographs has 3 channels (Red, Blue and Green), each of these channels having its own value (usually between 0 and 255). After the conversion, the black and white photograph has a single channel which is either black or white (zero's and ones).

One of the objectives of the image binarization module is to be fast, (a race can have 100000's of photographs which need to be analyzed in a short time). However, the matching results (participants to photographs) also need to be correct. Recognizing a wrong barcode 100 would lead to the wrong participant being eventually tagged in the photograph. It is also important to ensure good coverage so multiple barcodes 100 can be recognized in the same photograph. In many events, such as races, people are within groups.

In some embodiments, a basic threshold algorithm is applied which transforms the 3 RGB values of the pixel to black and white by averaging the 3 channels (turning it to one and having a value of 0-255—this is called gray scaling). And then according to a predefined threshold decide if that pixel is black or white. For example, a pixel may have RGB values of (100; 50; 30). Averaging the 3 channels (100+50+30/3=60) yields a single channel with the value of 60. Assuming the predefined threshold value is 125, every value equal to or greater than 125 will be converted to black (1) and every value below 125 will be converted to white (0). In the example above, 60 will be converted to white.

Since events can take place both indoors and outdoors and in various climatic and environmental conditions, the system of the invention cannot assume optimal cases in analyzing the photographs. Thus the image processing module takes into the following problems:

Lighting—Photographs (in outdoor events such as races) can be taken in many different lighting conditions, from an urban night race with cameras using flashes and people running in streets where the flashes glare from buildings, to a mid-day desert run with the sun being high in the sky and sand reflections.

Shadows: The photograph subjects are people and these people are in movement, the barcode 100 is typically printed on paper (like chest number) usually worn on their chest. The paper can bend, and the people can be photographed from either close or a long distance.

These conditions create a non-uniform photograph which presents challenges when deciding if a pixel should be black or white. In addition, event photographs can be taken be different cameras, each camera having a different chip and characteristics that produce a different output. Thus the system needs to cope with large variances in the photographs, both in a set of photographs from the same event, and between different events.

Accordingly, advance information about an event and also information gathered from starting the analysis of photographs of an event, the following parameters can be fine-tuned to better binarize the photographs.

Change the Threshold: changing the predetermined threshold value that decides if a pixel is black or white—this allows, for example, increasing sensitivity in low lighting conditions by increasing the value of the threshold.

Change the gray scaling algorithm: instead of simply averaging the 3 RGB channels, each channel can have its own function/rules, for example, giving a channel a different weight or having minimum and maximum values for a channel.

Looking into neighboring pixels: instead of binarizing every pixel on its own, neighboring pixels are also analyzed and the binarization process considers neighboring pixels when making a decision about a given pixel. This method works well, for example, when there are few people in a photograph each of them in a different area with different lighting/shadows conditions, and thus a global threshold may not be optimal to for all people and might cause one person not to be recognized. Having a local environment for each pixel means that it is influenced by the surrounding area but doesn't affect pixels that are further away.

Figure 3:
FIG. 3 shows the result after gray scaling by average the photograph of FIG. 2.
Figure 4:
FIG. 4 shows the result after applying maximum channel to the photograph of FIG. 2.
Figure 5:
FIG. 5 shows the result after applying a threshold of 30% to the photograph of FIG. 2.
Figure 6:
FIG. 6 shows the result after applying a threshold of 70% to the photograph of FIG. 2.
Figure 7:
FIG. 7 shows the result after applying a threshold of 50% to the photograph of FIG. 2.

The following figures show different binarization results of the color photograph of FIG. 2. FIG. 3 shows the result after gray scaling by average; FIG. 4 shows the result after applying maximum channel; FIG. 5 shows the result after applying a threshold of 30%; FIG. 6 shows the result after applying a threshold of 70%; and FIG. 7 shows the result after applying a threshold of 50%.

Connected components/discretion/reduction—The image processing module analyzes a binarized digital photograph, by first analyzing the context of a barcode 100. The barcode 100 comprises a matrix 110 with black and white cells, surrounded by a black frame 120, in turn surrounded by a white frame 130 (see FIGS. 1A and 1B).

The image processing module starts by looking for areas in the photograph where black pixels are grouped together. The context is thus not a single image pixel but a group of pixels.

The barcode 100 characteristics mean that at the very least a certain amount of photograph pixels would be needed for even the human eye to recognized the existence of a barcode 100 and see its matrix 110 cells, so this dictates the minimal size for a barcode 100, and from that the minimal size of the matrix 110 cells. The minimal matrix 110 cells size translates the minimal size of photograph pixels.

Taking a window a little smaller (in photograph pixels size) than the minimal value we calculated earlier, the image processing module can look for areas in the binarized photograph that are all black. These would be our reduced size photograph. When in the next phase, we group together black pixels, we implicitly reduce the resolution of the photograph, because to create a black pixel we might demand 8 of 9 adjacent pixels to be determined as black. And thus we turn 9 pixels into 1 pixel effectively.

This process reduces single/low level pixel noise. And furthermore, this reduction allows yet more smoothing of the photograph, compensates for any specific camera (lens or otherwise) distortion, and barcode 100 bending. Allowing lines that might not be 100% straight in real photograph resolution to be "pixelated" produces yet more coverage.

Figure 8:
FIG. 8 shows a photograph after using a 4×4 window to connect components with 9 of 16 pixels needed to produce a black pixel.

FIG. 8 shows a photograph after using a 4×4 window to connect components with 9 of 16 pixels needed to produce a black pixel.

Figure 9:
FIG. 9 shows a photograph after using a 3×3 window with a threshold of 8 pixels (out of 9) to produce a black pixel.

FIG. 9 shows a photograph after using a 3×3 window with a threshold of 8 pixels (out of 9) to produce a black pixel.

Corner and edge detection—At this stage the image processing module has produced a reduced resolution binarized photograph, and proceeds to search for one or more actual barcodes 100 in the photograph.

Each barcode 100 is 4 cornered, and thus it makes sense to search for a barcode 100 by locating its corners. In the current state (reduced size binarized photograph), a corner would be a black pixel that would be surrounded by white pixels from 2 sides. So technically, if the image processing module searches the reduced photograph and checks each black pixel, it would assume a pixel represents a possible corner if it has 3 consecutive white pixels that do not create a line (creating a corner).

A possible barcode 100 edge would be represented by a set of adjacent black pixels that have white pixels on one side (same side for all pixels).

After locating these possible corners and edges candidates, it is necessary to decide if they in fact create a barcode 100. The barcode 100 is a typically a square (white background surrounding a black frame 110 with black and white pixels inside). It is necessary not relay on the identified barcode 100 in the photo to be a perfect square, which would only happen when the barcode 100 is facing the camera perfectly (the more the photograph is taken with the angle, the less perfect the square is captured). Furthermore, it is possible for the barcode 100 to be rotated as it will be in real life in all 3 dimensions and still be identified.

The barcode 100 when printed is a perfect square, but allowing for rotations in real life, one can expect to find a 4 sided (4 cornered) convex polygon captured in the photograph. If the barcode 100 (for example, the bib number on a runner's chest) is too bent it might create a concave polygon and in these extreme cases the barcode 100 might not be identified in the photograph.

After identifying the possible corners and edges candidates, some heuristic (and specific problem solving) algorithms can be applied to reduce the possibilities, disregarding any shapes that do not meet defined criteria (this stage uses known regression analysis tools with approaches like least squares algorithm to reduce possibilities and so lead to faster detection). After possible elimination of weak candidates, the remaining possible barcodes 100 candidates are considered, each barcode 100 represented by a group of 4 corners.

The image processing module can take into account specific parameters such as:

1. Using race specific parameters: Not all events are run in the same environment. A kayak race with photographs taken from the side of a river from far is not the same as a person running and the photographer standing a meter in front of him/her. So different sizes of barcodes 100 might be recommend to use, with different inner content (matrix 110 cells), which means that in some cases the image processing module might look for different sizes of barcodes 100 in the photograph. (Size being the total photograph pixel size of the barcode 100).

2. Interference: While some interference is implicitly fixed with the reduction phase, some needs to be addressed explicitly. For example, it is common for runners to wear headphone while running, and as it happens the headphones wire tends to hang in front of them landing on the bib number and slightly covering the barcode 100. The outer interference (meaning the barcode 100 frame 120, 130) is something that can be tolerated by looking for edges that almost create a corner (in the case that we have 4 edges 3 corners and something is not perfect in the last corner), this is if a single corner is obscured. And in the case the wire hanging in front of the barcode 100, it might obscure 2 edges (in addition to the matrix 110 cells), but leave 4 good corners. This case is in fact simpler since the corners are a better potential component to work with.

Figure 10:
FIG. 10 is a photograph showing how using a 3×3 window for corners (painted as red) the result is zoomed in on runner 7054.
Figure 11:
FIG. 11 is a photograph showing how using a 3×3 window for lines (painted blue) the result is zoomed in on runner 7054.

FIGS. 10, 11 are photographs showing how using a 3×3 window for corners (painted as red), and lines (painted blue) the result is zoomed in on runner 7054.

3D to 2D transformation—It is at this point that image processing module has possible barcode 100 candidate(s), represented by 4 corners, which are located on 4 specific photograph pixels. The next step is then to arrive to a decision if the content of the photograph between those corners is in fact a valid barcode 100.

The 2D barcode 100 has been implanted in the 3D world, and the first step to decide if it is a valid barcode 100 is to find out what is the transformation that took place between the 2D perfect barcode 100 world and the real 3D world.

This problem implies that when calculating the transformation between these 2 worlds it is assumed that we are looking for a perspective projection matrix—perspective meaning closer objects will be bigger in the photograph than farther away objects. Unlike an orthographic projection where day-to-day "supermarket" barcodes are used, in which the barcode is facing the camera/scanner directly in front of it and it is very close to it. Following is the algebra principles necessary to make this translation.

It can assumed that each point P in 3D space (or a set of 3D world barcode 100 coordinates) and represented as P=(Xi, Yi, 0), can be transformed into a coordinate on the 2D photograph $(x_i, y_i)$. (the zero for the z value in the 3D vector is since the barcode 100 is flat and has no depth of its own), using these transformations:

A. Rotation transformation—how the camera is rotated in relevance to the barcode 100—let's call it Matrix R—After multiplication we get $P_a$=RP=$(Rx_i, Ry_i, 0)$.

B. Position transformation—where is the camera relevant to the barcode 100, represented by a matrix T—or a vector $(t_x, t_y, t_z)$. Adding this movement we can $P_b$=$P_a$+T=$(Rx_i+t_x, Ry_i+t_y, t_z)$.

C. A perspective projection—to calculate how the distance between the camera and barcode 100 effects the size of the barcode 100—this is done by dividing the x and y values obtained after the previous 2 matrices, with the z value of the barcode 100. And so we get $P_c$=$P_b/z_b$=$((Rx_i+t_x)/t_z, (Ry_i+t_y)/t_z, 1)$. Notice how we flattened the 3D world to 2D photograph world, and so z is irrelevant.

D. A set of parameters which are specific for each camera that represent how the camera perceives the object and flatten it into the photo, this is calculated by adding a linear function to each one of the camera focal lengths (x and y) (We assume linear for our model, from our experience this is enough). If we represent the focal lengths function as $f(x)=F_x x+C_x$ and $f(y)=F_y y+C_y$ respectively, we get: $P_d$=$f(P_c)$.

Finally we are left with the 2D coordinate point in the photograph:

$$x_i=F_x(Rx_i+t_x)/t_z+C_x$$

$$y_i=F_y(Ry_i+t_y)/t_z+C_y$$

Now, the image processing module is not interested in the actual values of the focal function, as it does not intend to "synthesize" a point. Instead, the image processing module is only interested in the final transformation from the 3D world to 2D. So therefore one can combine $F_x$ and $C_x$ with R into one set of parameters, and divide both functions by $t_z$ for a simpler computation which would result in:

$$x_i=(a_1X_i+a_2Y_i+a_3)/(a_7X_i+a_8y_i+1)$$

$$y_i=(a_4X_i+a_5Y_i+a_6)/(a_7X_i+a_8y_i+1)$$

In summary, the preprocessing disclosed above resulted in:
1. Having a simple and fast mathematical translation function between 3D real world and 2D photograph world.
2. Having a set of potential corners of barcodes 100 on the photograph, represented as 2D pixels coordinates.
3. Using a 3D world model we implicitly allowed for a much better model of photography of barcodes 100. The barcode 100 of the invention can be recognized even when photographed from a much wider range of angles up to 60 degrees (as opposed to QR code or other 2D barcodes).

So how is this data used?

The potential corners in the photograph were reduced to groups of 4 corners that are suspected to form a barcode 100. Four corners, each represented in the 2D space by 2 coordinates (x,y), produces a total of 8 values.

The translation function uses 8 unknown parameters.

The 3D world barcode 100 values are known in advance (they are the basic barcode 100 world coordinates), so they can called (−1,−1), (−1,1), (1,−1) and (1,1).

It is necessary to solve then 8 linear equations with 8 values. As a result we obtain the unknown parameters $a_1$-$a_8$.

It is now possible to go back and forth from barcode 100 pixels to photograph pixels (for a specific set of 4 corners).

Feature/data identification—Now that it is possible to obtain a transformation between the 2D and 3D worlds, it is necessary to look inside the potential barcode 100 (between the 4 corners) to check if that area is in fact a matrix 110 with the correct amount of cells, and what the matrix 110 value is. If it is in fact a barcode 100 the matrix analysis module will then calculate the matrix 110 value. The matrix 110 value is associated with the participant ID in the event, for example, the runner number in a race.

Research and pilot runs suggested the following statistics and facts about mass events:
1. 95% of races involve less than 15000 people.
2. In more than 90% of photographs taken in races, using manual and automatic photography, it was noticed that the runner's chest number (and barcode 100 placed on it) is at an angle of 60 degrees or less from the photographer.
3. Runners' distance from the photographer varies, but since photographers use lenses, the overall final size of the runner in the photograph that is valid for a person to recognize themselves in, is in a somewhat steady range (meaning you see something between a head and a full body.
4. For marketing reasons, correct identification is very important. Keeping in mind that the event offers event photographs to participants, one would not want a person to get the wrong photograph. The system aims for at least a 99% precision rate when deciding if a barcode 100 is in fact in the photograph. Precision is very important even if it comes in the expense of coverage. In other words, it is preferred to not recognize a barcode 100 in a photograph, then to recognize a barcode 100 but make a mistake on the person wearing it.

Taking these considerations into account, it is preferred to use a matrix 110 of black and white pixels inside the barcode 100 to encode the matrix 110 value associated with the participant.

The matrix 110 is built of same width and length cells, this helps in simplicity.

To enable a 60 degree coverage it is necessary for the barcode 100 to maintain both types of information:
Corners should be visible; and
Contents of the matrix 110 inside the barcode 100 should be detectable allowing each matrix 110 cell at least 2 photo pixels.

As for the size of the matrix 110, the minimal effective size is 5×5 cells, this gives 25 bits of information with each black and white cell representing a 0 or 1 bit. Using 4×4 with 16 bits would be too close to our range and leave us with little options for code correction. For example, for a 15,000 runners race, 14 bits are used for the information and we are left with 11 bits for error detection and correction. Code correction is used when information can be lost, and adds more information to the data so that the full information can be recovered even if not all information can be read. An example of code correction is Cyclic Redundancy Check (CRC). The invention can use any code correction of the art.

Considering one dimension of the barcode 100 we would need 5 matrix 110 cells, and 2 frame cells (inner black frame 120 and outside white frame 130, the size of each frame equal to the size of a matrix 110 cell), yielding 7 cells total for the barcode 100 side (barcode 100 of 7×7 cells). If we need at least 2 photograph pixels per each one of these barcode 100 cells, we would need to have at least 14 pixels in the photograph to have a detectable barcode 100 with its contents.

If we use the math detailed above, we realize that considering the 60 degree angle of the photograph, along with the 14 pixel size we need, we could use a barcode 100 anywhere from 1.5-6 centimeter to recognize a barcode 100 that is 1-25 meter away.

In a case where we need to account for more the 15,000 runners in a single race (which is a standard in very large and known races—NYC marathon, London Marathon etc. . . . ), but still try to maintain a high accuracy and coverage of barcodes 100, we would need to use a different internal matrix 110, and so instead of 5×5 we could use 6×6 and have 36 bits of information allowing for a bigger range. When using this matrix 110 we allow 20 bits for the encoding and are left with 16 bits for error correction. Obviously, 20 bits gives us a range of more than a million people, and no race on earth has even close to that many runners.

Using a 6×6 matrix 110 does cause more information to be encoded in the same photograph pixel space, which means we compensate this by using a larger barcode 100 in real life.

When using a larger barcode 100 is not possible (not enough room on the runners bib for example), and while still needing to account for more than 15,000 participants, the system of the invention is able to create more information on the same size and design of a barcode 100 by changing the barcode 100 colors. Instead of using black and white pixels only, we can allow 3 colors for the inner pixels (cyan, magenta and yellow). This allows us 25 pixels, where each represents 3 possibilities, giving us $3^{25}$ combinations, which is more than enough. When using this method we need to check all 3 photo color channels individually and not just black and white.

Since the image processing module can perform the transformation between the barcode 100 coordinates and real world coordinates, it can look inside the barcode 100, identify the matrix 110 cells, look at each area of a cell and translate it into the photograph pixels, and examine what are the photo pixels values in that area. Since matrix 110 cells are also square, it can examine an area of the photograph that is again a convex 4 sided polygon.

The area is divided based on the 4 corners of the barcode 100 and the translation function, to create a set of inner polygons which need to be examined.

A 5×5 matrix 110 has 25 such polygons which need to checked and according to what is decided the content of those internal polygons are, it is decided what are the cells seen, if it is a valid barcode 110, and if so what its value is.

Code correction allows us some accurate identification on the virtual data level (what we encoded). And also compensates for some real world problem where loss of information is frequent (like some Concealment of some inner pixels).

Also, due to the size of the real world barcodes 100, since such an inner polygon is covered with more than a single photograph pixel, when examining an inner polygon to decide if it represents a 1 or 0 (black or white), the image processing module can use different heuristics. The image processing module can average the photograph pixels in that area, or again decide on a threshold, it can select the middle pixel and so forth. This also helps in cases where the photograph examined is not perfect, contains some real world interference, or the process performed so far has left some artifacts.

Figure 12:
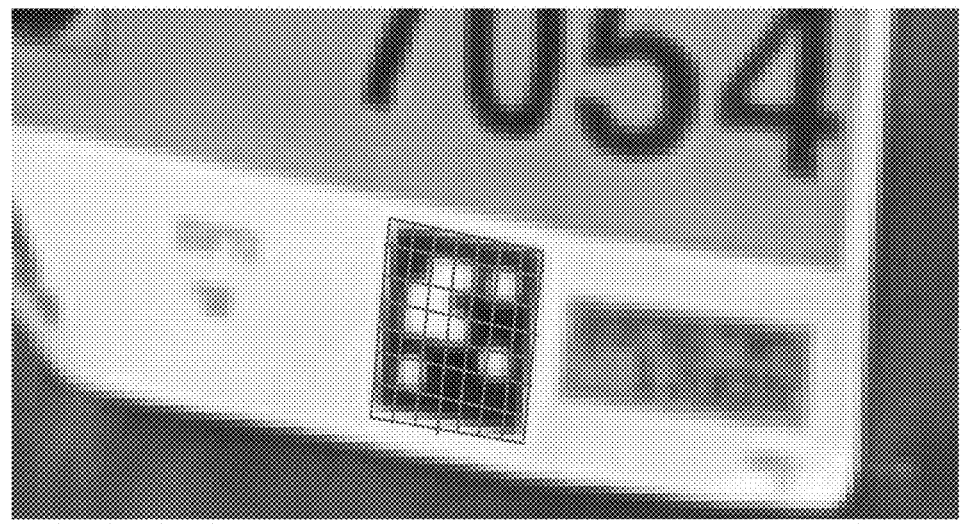
FIG. 12 shows a photograph of a bilinear grid on barcode for runner 7054.

Reference is now made to FIG. 12 showing a photograph of a split on barcode 100 for runner 7054.

Figure 13:
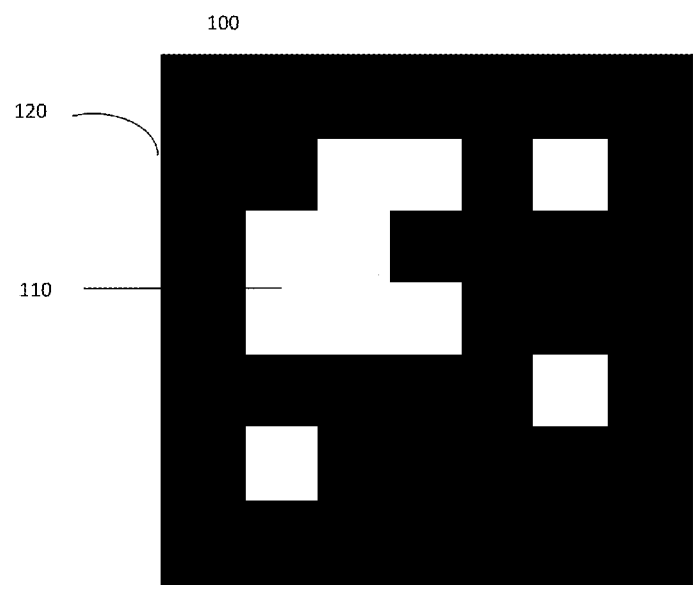
FIG. 13 shows the actual barcode 7054.

FIG. 13 shows the actual barcode 100 with a matrix 110 value of 7054.

Due to marketing reasons, it is preferred by event organizers to share photographs as soon as possible and sometimes even during an event, for example, during a race while people are still running. This means that the system is required to analyze a large set of photographs (some races can have 100000's of photographs) in a very short time.

To optimize the speed of the analysis, different aspects of the process can be optimized according to the particular aspects and conditions of the event.

When calculating the size of the barcode 100, it is necessary to get to a 14 photograph pixel barcode 100. But as mentioned before, the size of the actual real life barcode 100 varies, and so by normally using a little more than the minimal size, it is possible to get a bigger size of photograph pixels for the barcode 100. This allows reducing the photograph size before analyzing it, while not losing needed information.

This step means that the system is capable of analyzing smaller photographs, and so when dealing with large number of photographs, the process total time is shorter, and photographs can be identified and distributed faster.

In some embodiments, photographs are shared on social networks in accordance with permissions given by participants.

In some embodiments, the distributed photograph is modified by the system. The modification comprises adding graphical elements, highlighting certain areas, cropping, building a collage of several photographs, adding special effects or any combination thereof.

Figure 14:
FIG. 14 shows a race photograph where 3 race elements have been added to the top of the picture, based on identified barcode position, and showing various race data.

For example, pertinent data the participant and event can be added to the photograph. FIG. 14 shows a race photograph where 3 race elements have been added to the top of the picture: on the top left, an insert pointing out to the runner's barcode, with the runner's name, race date and race time and race distance at the point the photograph was taken; in the middle, an insert with the runner's average time; and on the right side, a map of the race showing the actual position of the runner.

This is an innovative visualization concept that allows visualizing data layers on participants photographs. Some of the data elements added, are added in consideration of an identified barcode 100 in the photograph. For example, the runner's time and distance shown in a frame, and a line pointing from the frame to the runner's barcode 100.

Figure 15:
FIG. 15 shows a race photograph where one runner is shown in color, while other parts of the photograph are in black and white.
Figure 16:
FIG. 16 shows a race photograph where areas other than the runner are defocused.

Another ways to use the barcodes 100 position for visual processing/styling include:

1. Change the specific style of the photo around the participant (e.g.—color area in a black & white photo), see FIG. 15;

2. Focus area in a de-focused photo, see FIG. 16; and

Figure 17:
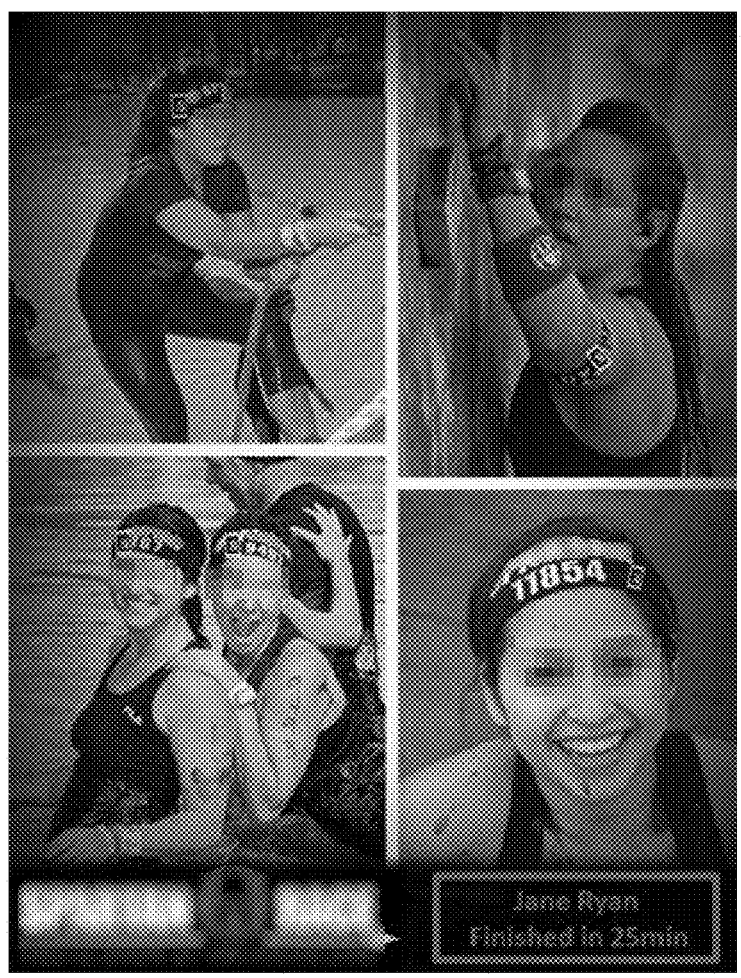
FIG. 17 shows a race photograph generated automatically as a photo-collage based on cropping several photographs around the same barcode.

3. Auto-generate photo-collage by cropping specific area in each photo based on the 2D barcode 100 position, see FIG. 17.

Figure 18:
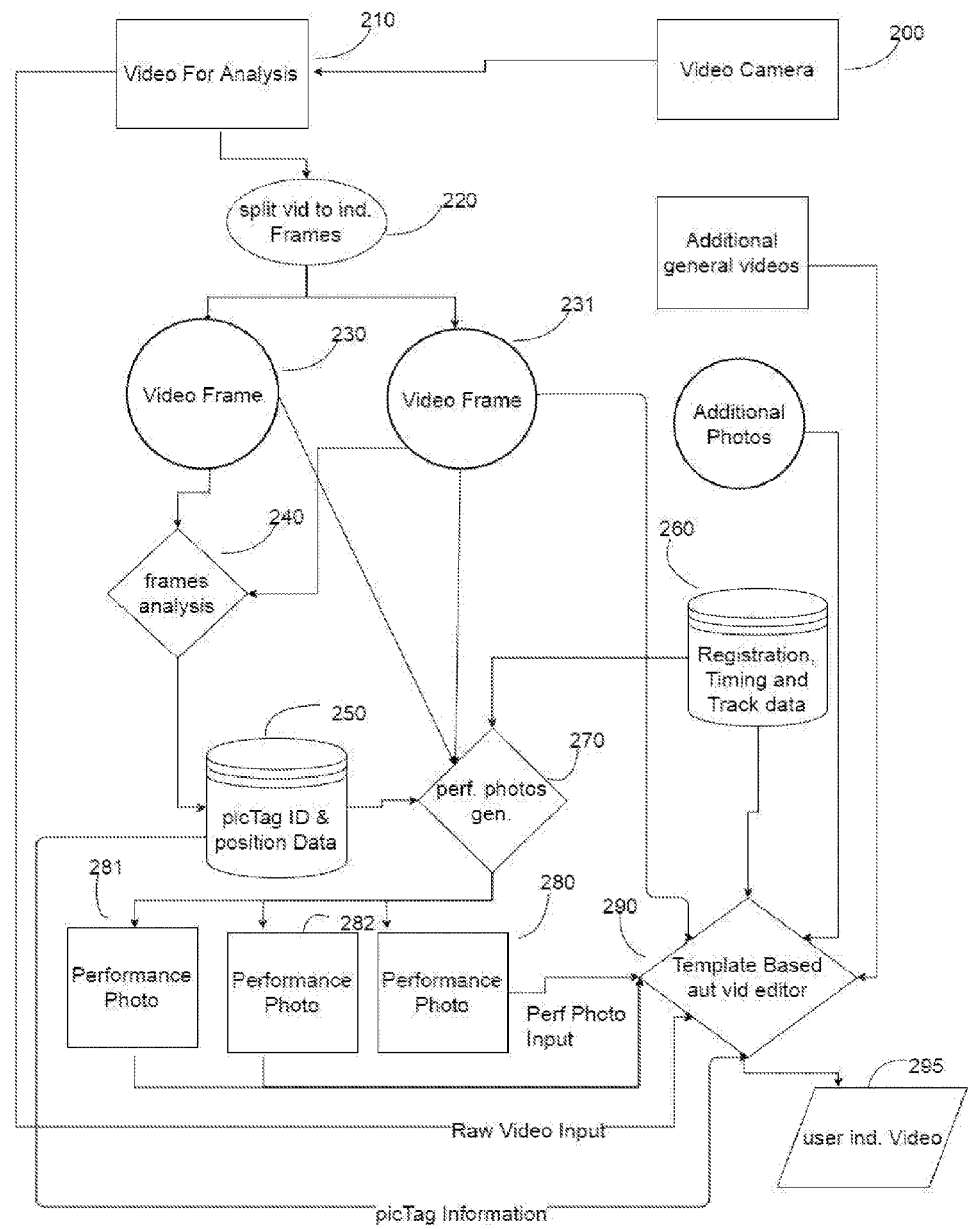
FIG. 18 is a flowchart showing capture, analysis and processing of video images.

Reference is now made to FIG. 18 showing a flowchart of the capture, analysis and processing of video images. In step 200 a digital video camera captures a video movie stream of an event. The captured stream is then stored in the memory of the system of the invention for analysis in step 210, meta information about the video stream is also saved (such as frames per second—or fps). In step 220 the video stream is separated to a plurality of individual frames (steps 230, 231) as regular individual digital images to be used in the same manner as described above. In step 240 each a video frame (digital image) is analyzed by the image processing module and matrix analysis module, as described above, in order to identify participant barcodes 100, and the barcode 100 position in the image. This information is then stored in the memory and/or storage of the invention (step 250). This information details what photos have been found to contain barcodes 100 along with the barcode information and location, and what photos were not found to contain barcodes 100. Next, in step 260 participant event data (for example, registration details, timing and track data for a race) is sent to the performance photo generator receives—step 270. The performance photo generator also receives the individual frames extracted from the original video (steps 230, 231). And then the performance photo generator generates photos with performance data (information in graphic form is added to the photo pixels) in steps 280, 281, 282. Examples for such graphic information can be the time of the photo, an arrow pointing to the runner in the photo etc. In step 290 a template-based automatic video editor receives one or more available inputs comprising: the individual frames generated from steps 280, 281, 282, the original video frames (steps 230,231), the original video analysed (step 210), additional raw video inputs (for example a video of the pre race activity where people might be listening to a band playing music for the runners), more raw photos (for example photos taken by a drone to see the entire area from above), event information (step 260), and photo meta data extracted (step 250). The template-based automatic video editor then generates according to a set of pre defined video templates in step 290, a new and unique video containing individual user content—step 295.

A video template, for example, can consist of a set of time and content combinations specifying when each input is shown in the final video. Another example can be that if the photos created in steps 280,281,282 were from consecutive frames in the original video, they could be encoded back to a continuous video that has the graphical information added dynamically having the effect of a moving graphic in the original video, like an arrow following the runner in movement. Also, since the template-based video editor has the picTag Data information created in step 250, and has the original video frames (step 230,231), a template can specify that the editor should encode these original frames even if they were not all found to contain barcodes 100—If for example out of 10 original consecutive frames (lets call them 2301, 2302, 2303, 2304, 2305, 2306, 2307, 2308, 2309, 2310), only 3 (non consecutive) had been found to contain barcodes 100 (say 2301, 2304, 2310), the Performance photo generator would create 3 Performance photos accordingly (lets call them 2801, 2804, 2810) a template could decide that the entire sequence contains some barcodes and encode a new consecutive sequence out of either all frames from 2301-2310, or a mix of the original frames and the performance photos (such a sequence would consist of 2801, 2302, 2303, 2804, 2305, 2306, 2307, 2308, 2309, 2810). This new sequence can than be edited as part of the final user video.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A computerized system comprising a processor and memory for matching one or more participants of an event to a digital photograph they appear in, the system comprising:
   (i) an image processing software module adapted for analyzing via a processor a digital photograph stored in memory of one or more participants of said event taken from a distance of 1 to 25 meters and captured in angle of up to 60 degrees and identifying one or more barcodes on said digital photograph, each barcode comprising a square-shaped matrix made of 5×5 or 6×6 cells, the matrix surrounded by a dark color frame and the dark color frame surrounded by a light color frame, each matrix having a unique value, said unique value being associated with a participant identification (ID); and
   (ii) a matrix analysis software module adapted for reading via a processor a matrix stored in memory, said matrix identified by the image processing module, calculating its value and determining the participant ID associated with said value thus matching the participant with said digital photograph the participant appears in.

2. The system according to claim 1, wherein said digital photograph is a color digital photograph.

3. The system according to claim 2, wherein an image binarization software module transforms via a processor each pixel stored in memory of said color digital photograph to either a black or a white pixel according to a predetermined threshold, thus producing a black and white digital photograph.

4. The system according to claim 3, wherein the image binarization module averages the Green, Red, Blue (RGB) values of each pixel and then applies a predetermined threshold value above which the value of the pixel is transformed to black and below or equal to the value of the threshold the value of the pixel is transformed to white.

5. The system according to claim 4, wherein the value of the threshold is calculated in consideration with geographic and climatic conditions of the event.

6. The system according to claim 4, wherein averaging the RGB values of each pixel is achieved by assigning a different weight to each RGB value.

7. The system according to claim 4, wherein the decision whether to transform a pixel to black or white also considers the values of neighboring pixels.

8. The system according to claim 3, wherein the dark color frame is a black frame and the light color frame is a white frame.

9. The system according to claim 2, wherein an image grayscaling software module transforms via a processor said color digital photograph stored in memory to a grayscale digital photograph.

10. The system according to claim 3, wherein the image processing module identifies a matrix by reducing the size of the digital photograph and searching for a black frame surrounding the matrix, and a white frame surrounding said black frame.

11. The system according to claim 10, wherein the image processing module takes into consideration race specific parameters and interference with other objects.

12. The system according to claim 10, wherein the image processing module is further adapted to analyze the photograph area inside the identified black frame by performing a 3-dimensional to 2-dimensional transformation analysis.

13. The system according to claim 1, wherein said matrix is a square with whose width is between 2 and 6 centimeters (cm) and whose height is between 2 and 6 cm.

14. The system according to claim 1, wherein said matrix value is the participant identification.

15. The system according to claim 1, wherein the matrix value is the participant ID; a function is applied to transform the matrix value to the participant identification by computation or translation; or matrix values and associated participant ID's are stored in a database.

16. The system according to claim 1, wherein said matrix is placed on a participant tag.

17. The system according to claim 16, wherein the participant tag is a race bib, bicycle plate, helmet sticker, name tag, branded cards or branded stickers.

18. The system according to claim 1, further comprising an image resizing software module adapted to resizing via a processor an original photograph stored in memory to a lower resolution photograph, so that the resized photograph is processed faster by the image processing module, said lower resolution being any value between 2,000 pixels and 3,000 pixels.

19. The system according to claim 1, wherein the digital photograph is sent to the participant via electronic mail and/or loaded to a social network account associated with the participant.

20. The system according to claim 18, wherein the digital photograph is resized to a lower pixel value before being sent to the user via electronic mail and/or before uploaded to a social network.

21. The system according to claim 19, wherein the digital photograph is loaded to the participant's Facebook™ account, and the digital photograph is resized to the Facebook™ image publishing size.

22. The system according to claim 1, further comprising an image overlay software module adapted for overlaying via a processor on the digital photographs stored in memory data elements associated with the participant.

23. The system according to claim 22, wherein said data elements relate to race information comprising average participant speed, distance covered by the participant, position of the participant on a map, location of the participant or any combination thereof.

24. The system according to claim 22, wherein the position of one or more data elements is based on the position of a barcode in the digital photograph.

25. The system according to claim 1, wherein the digital photograph is retouched with one or more special effects based on the matrix position in the photo.

26. The system according to claim 25, wherein said one or more special effects comprise: changing the colors to black and white around the participant in order to highlight the participant in the digital photograph; changing the focus around the participant in order to highlight the participant in the digital photograph; changing the contrast around the participant in order to highlight the participant in the digital photograph; and generating a photo-collage by cropping specific areas in several digital photographs of the participant and combining them to one collage photograph.

27. The system according to claim 1, wherein the digital photograph is a frame in a digital video.

28. A computerized method comprising using a processor and memory for matching one or more participants of an event to a digital photograph they appear in, the method comprising the steps of:
   (i) analyzing a digital photograph of one or more participants of said event taken from a distance of 1 to 25 meters and captured in angle of up to 60 degrees and identifying one or more barcodes on said digital photograph, each barcode comprising a square-shaped matrix made of up to 8×8 5×5 or 6×6 cells, the matrix surrounded by a dark color frame and the dark color frame surrounded by a light color frame, each matrix having a unique value, said unique value being associated with a participant identification (ID); and
   (ii) reading a matrix identified in step (i), calculating its value and determining the participant ID associated with said value thus matching the participant with said digital photograph the participant appears in.

29. A computerized system comprising a processor and memory for matching one or more participants of an event to a digital video they appear in, the system comprising:
   (i) an image processing software module adapted for analyzing via a processor a frame stored in memory of a digital video of one or more participants of said event and identifying one or more barcodes on said digital photograph, each barcode comprising a square-shaped matrix made of 5×5 or 6×6 cells, the matrix surrounded by a dark color frame and the dark color frame surrounded by a light color frame, each matrix having a unique value, said unique value being associated with a participant identification (ID); and (ii) a matrix analysis software module adapted for reading via a processor a matrix stored in memory, said matrix identified by the image processing module, calculating its value and determining the participant ID associated with said value thus matching the participant with said digital photograph the participant appears in.

30. The system according to claim 29, wherein the video is taken from a distance of 1 to 25 meters and captured in angle of up to 60 degrees.

31. The system according to claim 29, further comprising an image overlay software module adapted for overlaying via a processor on one or more digital frames of said digital video stored in memory, data elements associated with the participant.

32. The system according to claim 31, wherein said data elements relate to race information comprising average participant speed, distance covered by the participant, position of the participant on a map, location of the participant or any combination thereof.

33. The system according to claim 31, wherein the position of one or more data elements is based on the position of a barcode in the digital frame.

34. The system according to claim 29, wherein the digital frame is retouched with one or more special effects based on the matrix position in the digital frame.

35. The system according to claim 29, wherein said special effects comprise: changing the colors to black and white around the participant in order to highlight the participant in the digital frame; changing the focus around the participant in order to highlight the participant in the digital frame; and changing the contrast around the participant in order to highlight the participant in the digital frame.

* * * * *